US012573628B2

(12) United States Patent
Wang et al.

(10) Patent No.: US 12,573,628 B2
(45) Date of Patent: Mar. 10, 2026

(54) NEGATIVE ELECTRODE MATERIAL, AND NEGATIVE ELECTRODE PLATE, ELECTROCHEMICAL DEVICE AND ELECTRONIC DEVICE INCLUDING SAME

(71) Applicant: Ningde Amperex Technology Limited, Ningde City (CN)

(72) Inventors: Chao Wang, Ningde City (CN); Ting Yi, Ningde City (CN); Hang Cui, Ningde City (CN); Yuansen Xie, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 669 days.

(21) Appl. No.: 17/973,865

(22) Filed: Oct. 26, 2022

(65) Prior Publication Data

US 2023/0068610 A1    Mar. 2, 2023

Related U.S. Application Data

(63) Continuation of application No. PCT/CN2020/087205, filed on Apr. 27, 2020.

(51) Int. Cl.
H01M 4/58 (2010.01)
C01B 32/907 (2017.01)
(Continued)

(52) U.S. Cl.
CPC ......... H01M 4/5825 (2013.01); C01B 32/907 (2017.08); H01M 4/366 (2013.01);
(Continued)

(58) Field of Classification Search
CPC ............... H01M 4/5825; C01B 32/907; C01P 2004/61; C01P 2002/86
See application file for complete search history.

(56) References Cited

U.S. PATENT DOCUMENTS 10,611,642 B2    4/2020  Haon et al.
2006/0022198 A1   2/2006  Aramata et al.
(Continued)

FOREIGN PATENT DOCUMENTS

CN        1758466 A     4/2006
CN      102299338 A    12/2011
(Continued)

OTHER PUBLICATIONS

International Search Report dated Jan. 28, 2021, issued in counterpart International Application No. PCT/CN2020/087205, with English Translation. (6 pages).
(Continued)

*Primary Examiner* — Maria Laios
*Assistant Examiner* — Benjamin T Lustgraaf
(74) *Attorney, Agent, or Firm* — WHDA, LLP

(57) ABSTRACT

A negative electrode material, and a negative electrode plate, an electrochemical device, and an electronic device including the same. The negative electrode material includes $SiM_xC_y$, where $0.5 \leq x \leq 2$, $0.5 \leq y \leq 4$, and M includes at least one of boron, nitrogen, oxygen, or aluminum; for $SiM_xC_y$, a particle size at a quantity accumulation degree of A % is $D_N A$, a particle size at a volume accumulation degree of B % is $D_V B$, and a half-peak width of a quantity distribution curve is $\Delta D_N$; and 2 µm$\leq(D_V 50 - D_N 50) \leq 6$ µm, and $1 \leq (D_N 99 - D_N 1)/\Delta D_N \leq 1.3$. The use of the negative electrode material, and the negative electrode plate, the electrochemical device and the electronic device including the same according to the present application achieve good cycle performance and energy density.

14 Claims, 1 Drawing Sheet

Chemical shift/ppm

(51) Int. Cl.
    *H01M 4/02*         (2006.01)
    *H01M 4/36*         (2006.01)
    *H01M 4/62*         (2006.01)

(52) U.S. Cl.
    CPC ......... *H01M 4/625* (2013.01); *C01P 2002/86*
    (2013.01); *C01P 2004/61* (2013.01); *C01P*
    *2004/62* (2013.01); *C01P 2006/12* (2013.01);
    *C01P 2006/40* (2013.01); *H01M 2004/021*
    (2013.01); *H01M 2004/027* (2013.01)

(56)           References Cited

U.S. PATENT DOCUMENTS

| | | | | |
|---|---|---|---|---|
| 2017/0133674 | A1* | 5/2017 | Murphy | H01M 4/0404 |
| 2017/0320744 | A1* | 11/2017 | Haon | H01M 4/136 |
| 2021/0036315 | A1* | 2/2021 | Put | H01M 4/625 |

FOREIGN PATENT DOCUMENTS

| | | |
|---|---|---|
| CN | 102299338 B | 6/2014 |
| CN | 107431196 A | 12/2017 |
| CN | 109923708 A | 6/2019 |
| CN | 110416523 A | 11/2019 |
| CN | 110911635 A | 3/2020 |
| CN | 110911636 A | 3/2020 |
| JP | 2015-022964 A | 2/2015 |
| JP | 2018-190746 A | 11/2018 |
| KR | 10-2017-0141020 A | 12/2017 |
| KR | 102025119 B1 | 11/2019 |
| KR | 10-20200073208 A | 6/2020 |

OTHER PUBLICATIONS

Office Action dated Feb. 22, 2025, issued in counterpart KR Application No. 10-2022-7035741. (6 pages).

Kaspar, J. et al., SiOC(N)/Hard Carbon Composite Anodes for Na-Ion Batteries: Influence of Morphology on the Electrochemical Properties, Journal of the Electrochemical Society, vol. 163, No. 2, p. A156-A162, 2016. (7 pages); cited in KR Office Action dated Feb. 22, 2025.

Office Action dated Mar. 22, 2025, issued in counterpart CN Application No. 202080099224.6. (7 pages).

* cited by examiner

NEGATIVE ELECTRODE MATERIAL, AND NEGATIVE ELECTRODE PLATE, ELECTROCHEMICAL DEVICE AND ELECTRONIC DEVICE INCLUDING SAME

CROSS REFERENCES TO RELATED APPLICATIONS

The present application is a continuation application of PCT application PCT/CN2020/087205, filed on Apr. 27, 2020, the disclosure of which is hereby incorporated by reference in its entirety.

TECHNICAL FIELD

The present application relates to the technical field of lithium-ion batteries, and in particular, to a negative electrode material, and a negative electrode plate, an electrochemical device, and an electronic device and an electronic device including the same.

BACKGROUND

Lithium-ion batteries are widely applied to the field of consumer electronics due to characteristics such as large specific energy, high operating voltage, low self-discharge rate, small volume, light weight, and the like. With the rapid development of electric vehicles and mobile electronic apparatuses, people have higher requirements on energy density, safety, cycle performance, and other related aspects of the lithium-ion batteries. Silicon materials have a broad prospect in application of the lithium-ion batteries by virtue of a high theoretical gram capacity (4200 mAh/g). However, there are also some problems in application of the silicon materials. First, volume expansion of the silicon materials can reach 300% when lithium is intercalated, thereby seriously affecting structural stability and cycle stability thereof, and also easily causing destruction of a separator to form a micro-short circuit. Second, by-products continue to be generated on the surface of the silicon materials, thus continuously consuming a lithium source in an electrolyte. Especially at high temperature, consumption in the electrolyte is accelerated, thereby affecting cycle performance of the lithium-ion batteries.

Therefore, there is an urgent need for a negative electrode material capable of further improving cycle stability of the lithium-ion batteries and reducing volume expansion of the lithium-ion batteries.

SUMMARY

In view of defects of the prior art, an objective of the present application is to provide a negative electrode material, and a negative electrode plate, an electrochemical device and an electronic device including the same, so as to promote battery cycle stability performance of a lithium-ion battery.

A first aspect of the present application provides a negative electrode material. The negative electrode material includes $SiM_xC_y$, where $0.5 \leq x \leq 2$, $0.5 \leq y \leq 4$, and M includes at least one of boron, nitrogen, oxygen, or aluminum; for $SiM_xC_y$, a particle size at a quantity accumulation degree of A % is $D_N A$, a particle size at a volume accumulation degree of B % is $D_V B$, and a half-peak width of a quantity distribution curve is $\Delta D_N$; and $$2 \ \mu m \leq (D_V 50 - D_N 50) \leq 6 \ \mu m, \text{ and } 1 \leq (D_N 99 - D_N 1)/\Delta D_N \leq 1.3.$$

In some implementations of the first aspect of the present application, a range of $D_N 99$ satisfies: 12.0 to 20.0 μm; a range of $D_N$ satisfies: 0.1 to 1.0 μm; and a range of $D_V 50$ satisfies: 4.0 to 10.0 μm.

In some implementations of the first aspect of the present application, in solid-state nuclear magnetic resonance (NMR) tests of the negative electrode material, a shift of an element silicon includes −5 ppm, −35 ppm, −75 ppm, and −110 ppm.

In some implementations of the first aspect of the present application, a specific surface area of the negative electrode material satisfies: 1.0 to 8.0 $m^2$/g.

In some implementations of the first aspect of the present application, the negative electrode material has a powder conductivity of 2.0 to 30 S/cm.

In some implementations of the first aspect of the present application, a nitrogen adsorption isotherm specified in IUPAC is type III.

In some implementations of the first aspect of the present application, at least one of carbon, a high molecular polymer, or a composite of the above substances exists on a surface of the negative electrode material.

The carbon includes at least one of amorphous carbon, a carbon nanotube, a carbon nanoparticle, a vapor-deposited carbon fiber, or graphene.

The high molecular polymer includes at least one of polyvinylidene fluoride, carboxymethyl cellulose, sodium carboxymethylcellulose, polyvinylpyrrolidone, polyacrylic acid, polystyrene-butadiene rubber, or a derivative of the above substances.

A second aspect of the present application provides a negative electrode plate, which includes a current collector and the negative electrode material according to any one of the above implementations.

A third aspect of the present application provides an electrochemical device, which includes a positive electrode plate and the above negative electrode plate.

A fourth aspect of the present application provides an electronic device, which includes the above electrochemical device.

For the negative electrode material provided in the present application, particle size distribution is improved, and compaction density of a negative electrode active material is optimized. Cycle performance and energy density of the negative electrode plate, the electrochemical device, and the electronic device that use the negative electrode material are improved.

In this specification, the term "$D_V 50$" represents a particle size at which accumulative distribution of particles is 50% based on volume distribution, that is, a volume of particles having a particle size less than this particle size accounts for 50% of a total volume of all particles. The particle size is measured with a laser particle sizer.

The term "$D_N 99$" represents a particle size at which accumulative distribution of particles is 99% based on quantity distribution, that is, a quantity of particles having a particle size less than this particle size accounts for 99% of the total quantity of all particles. The particle size is measured with a laser particle sizer.

The term "$D_N 1$" represents a particle size at which accumulative distribution of particles is 1% based on quantity distribution, that is, a quantity of particles having a particle size less than this particle size accounts for 1% of the total quantity of all particles. The particle size is measured with a laser particle sizer.

The term "$\Delta_D N$" represents a half-peak width of a quantity distribution curve of particle sizes of particles based on the quantity distribution.

BRIEF DESCRIPTION OF DRAWINGS

In order to more clearly illustrate embodiments of the present application and a technical solution of the prior art, drawings required and used in the embodiments and the prior art are briefly introduced below. Obviously, the drawings described below are only some embodiments of the present application, and a person of ordinary skill in the art may still derive other drawings from these accompanying drawings without creative efforts.

DETAILED DESCRIPTION

Figure 1:
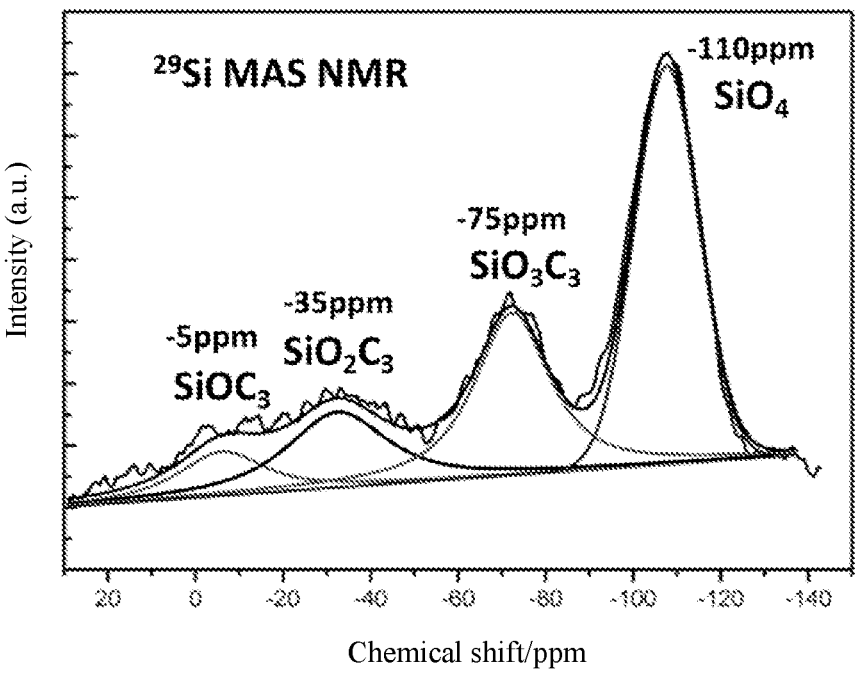
FIG. 1 is a solid-state NMR spectrogram of a negative electrode material SiOC according to Embodiment 1.

In order to make the objective, the technical solution, and the advantages of the present application more comprehensible, the following further describes this application in detail with reference to the accompanying drawings and embodiments. Obviously, the described embodiments are only some rather than all of the embodiments of the present application. All other embodiments obtained by a person of ordinary skill in the art based on the embodiments of the present application without creative efforts shall fall within the protection scope of the present application.

It should be noted that, in the specific implementations of the present application, an example in which a lithium-ion battery is used as an electrochemical device is used to illustrate the present application. However, the electrochemical device in the present application is not limited to the lithium-ion battery.

A first aspect of the present application provides a negative electrode material. The negative electrode material includes $SiM_xC_y$, where $0.5 \leq x \leq 2$, $0.5 \leq y \leq 4$, and M includes at least one of boron, nitrogen, oxygen, or aluminum; for $SiM_xC_y$, a particle size at a quantity accumulation degree of A % is $D_N A$, a particle size at a volume accumulation degree of B % is $D_V B$, and a half-peak width of a quantity distribution curve of particle sizes of particles is $\Delta D_N$; and $$2 \ \mu m \leq (D_V 50 - D_N 50) \leq 6 \ \mu m, \text{ and } 1 \leq (D_N 99 - D_N 1)/\Delta D_N \leq 1.3.$$

The inventors of the present application have unexpectedly found during in-depth research that, compared to the prior art, for the negative electrode material $SiM_xC_y$ in the present application, distribution of particle sizes of the negative electrode material $SiM_xC_y$ is adjusted, so that a negative electrode plate applying the negative electrode material can be ensured to have good cycle performance while having a higher compaction density. Without being limited to any theory, the inventors believe that it may be that uniform distribution of the negative electrode material $SiM_xC_y$ can promote the compaction density, and also has less adverse impact on the cycle performance.

In some implementations of the first aspect of the present application, a range of $D_N 99$ satisfies: 12.0 to 20.0 μm; a range of $D_N 1$ satisfies: 0.1 to 1.0 μm; and a range of $D_V 50$ satisfies: 4.0 to 10.0 μm.

The inventors have found that, in addition to controlling the distribution of particle sizes of the negative electrode material $SiM_xC_y$ to be uniform, the particle sizes $D_V 50$, $D_N 99$, and $D_N 1$ of the negative electrode material $SiM_xC_y$ also need to be improved. Without being limited to any theory, the inventors believe that the negative electrode material $SiM_xC_y$ with excessively large particles is easily broken during lithium deintercalation and intercalation, thereby resulting in a poor cycle. Furthermore, during tableting of the negative electrode material with large particles, damage is easily caused to a separator so as to generate self-discharge. The negative electrode material with small particles undergoes severe side reactions, thereby easily generating safety hazards. The particle sizes $D_V 50$, $D_N 99$, and $D_N 1$ of the negative electrode material $SiM_xC_y$ are controlled within the above ranges, a negative electrode plate having a higher compaction density and better cycle performance can be obtained.

In some implementations of the first aspect of the present application, in solid-state NMR tests of the negative electrode material, a shift of an element silicon includes −5 ppm, −35 ppm, −75 ppm, and −110 ppm.

The inventors unexpectedly found in the research that, compared with some existing negative electrode materials such as carbon silicon oxide, for the negative electrode material $SiM_xC_y$ in the present application, a chemical shift in solid-state NMR tests of an element silicon includes −5 ppm. Furthermore, it is found through testing that the negative electrode material $SiM_xC_y$ in the present application has lower expansion. Without being limited to any theory, the inventors believe that this may be due to a fact that a crystallization degree of the negative electrode material $SiM_xC_y$ in the present application is different from that in the prior art, and thus the negative electrode material $SiM_xC_y$ in the present application has lower expansion.

FIG. 1 is a solid-state NMR spectrogram of the negative electrode material $SiM_xC_y$ according to the present application, which shows that a shift of the element silicon includes −5 ppm, −35 ppm, −75 ppm, and −110 ppm.

In some implementations of the first aspect of the present application, a specific surface area of the negative electrode material satisfies: 1.0 to 8.0 m²/g.

After in-depth research, the inventors have found that: if the negative electrode material has an excessively small specific surface area, the negative electrode material cannot release stress well and is easily broken during lithium deintercalation and intercalation; if the negative electrode material has an excessively large specific surface area, a side reaction between the negative electrode material and an electrolyte is more severe at high temperature, resulting in deterioration of high temperature cycle performance.

In some implementations of the first aspect of the present application, the negative electrode material has a powder conductivity of 2.0 to 30 S/cm.

In the present application, an increase of C (carbon) content in the negative electrode material can improve the electrical conductivity, but compaction density of a prepared negative electrode plate is reduced, thereby affecting improvement of energy density. Controlling the powder conductivity of the negative electrode material to be within the above range can well balance electrical conductivity, compaction density, and energy density.

In some implementations of the first aspect of the present application, a nitrogen adsorption isotherm specified in IUPAC is type III.

Figure 2:
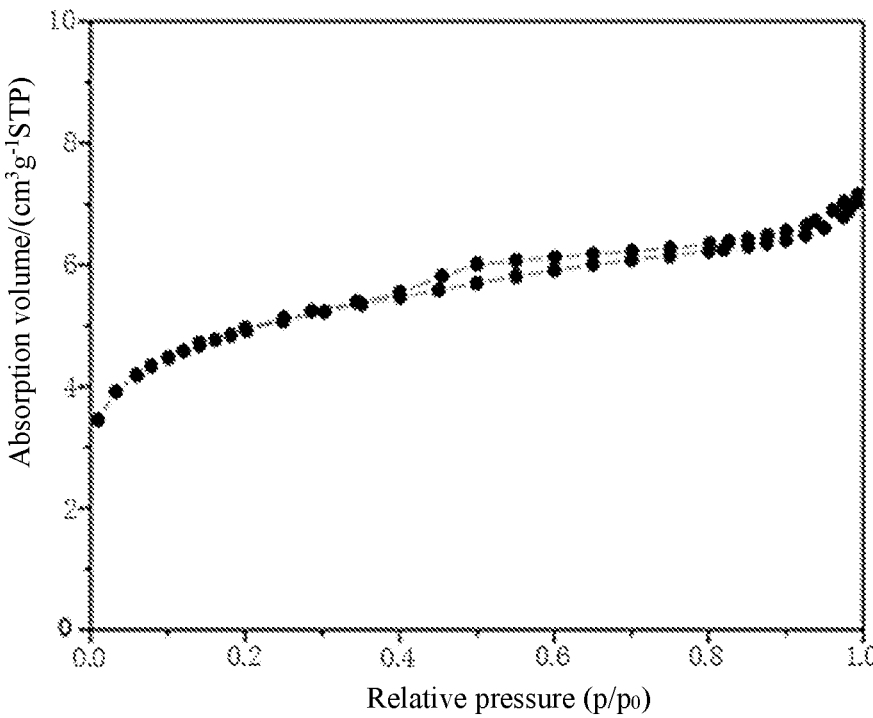
FIG. 2 is a nitrogen adsorption isotherm specified in IUPAC for a negative electrode material SiOC according to Embodiment 1.

FIG. 2 shows a nitrogen adsorption isotherm specified in IUPAC for the negative electrode material according to the present application, from which it can be seen that it is a type III adsorption isotherm.

In some implementations of the first aspect of the present application, at least one of carbon, a high molecular polymer, or a composite of the above substances exists on a surface of the negative electrode material.

The carbon includes at least one of amorphous carbon, a carbon nanotube, a carbon nanoparticle, a vapor-deposited carbon fiber, or graphene.

The high molecular polymer includes at least one of polyvinylidene fluoride, carboxymethyl cellulose, sodium carboxymethylcellulose, polyvinylpyrrolidone, polyacrylic acid, polystyrene-butadiene rubber, or a derivative of the above substances.

The inventors have also found in the research that presence of carbon on the surface of the negative electrode material can increase the electrical conductivity of the negative electrode material and improve electrical performance thereof. In the present application, a mode and content of adding carbon are not specially defined. For example, carbon may account for 1% to 30% of mass of the negative electrode material.

A second aspect of the present application provides a negative electrode plate, which includes a negative electrode current collector and a negative electrode active substance layer. The negative electrode active substance layer includes the negative electrode material according to any one of the above embodiments.

The negative electrode active substance layer may be coated on one or two surfaces of the negative electrode current collector, and a person skilled in the art can make a specific selection according to an actual need. This is not limited in the present application.

There is no particular limitation on the negative electrode current collector in the present application, and any negative electrode current collector known to a person skilled in the art may be used. For example, a negative electrode current collector formed by iron, copper, aluminum, nickel, stainless steel, titanium, tantalum, gold, platinum, and the like may be used. A copper foil or a copper alloy foil is particularly preferable. One of the above materials may be used alone, or two or more of them may be used in combination at any ratio.

In some implementations of the present application, the negative electrode active substance layer further includes graphite. The graphite may include at least one of natural graphite, artificial graphite, or mesocarbon microbeads. In some implementations of the present application, a mixture of the negative electrode material in the present application and graphite may be used as a negative electrode active substance.

In some implementations of the present application, the negative electrode active substance layer may further include a binder. The binder is not particularly limited, and may be any binder or a combination thereof known to a person skilled in the art. For example, the binder may include at least one of polyacrylate, polyimide, polyamide, polyamideimide, polyvinylidene fluoride, styrene-butadiene rubber, sodium alginate, polyvinyl alcohol, polytetrafluoroethylene, polyacrylonitrile, sodium carboxymethylcellulose, potassium carboxymethylcellulose, sodium hydroxymethylcellulose, or potassium hydroxymethylcellulose. One of these binders may be used alone, or two or more of them may be used in combination at any ratio.

In some implementations of the present application, the negative electrode active substance layer may further include a conductive agent. The conductive agent is not particularly limited, and may be any conductive agent or a combination thereof known to a person skilled in the art. For example, at least one of a zero-dimensional conductive agent, a one-dimensional conductive agent, or a two-dimensional conductive agent may be used. Preferably, the conductive agent may include at least one of carbon black, conductive graphite, a carbon fiber, a carbon nanotube, a VGCF (Vapor Grown Carbon Fiber), or graphene. An amount of the conductive agent is not particularly limited, and can be selected according to the common knowledge in the art. One of the above conductive agents may be used alone, or two or more of them may be used in combination at any ratio.

A third aspect of the present application provides an electrochemical device, which includes a positive electrode plate and the above negative electrode plate.

The electrochemical device in the present application includes, but is not limited to, all kinds of primary batteries, secondary batteries, fuel batteries, solar batteries, or capacitors. A typical electrochemical device is a lithium-ion battery, which is a secondary battery. The electrochemical device, such as the lithium-ion battery, generally includes a negative electrode plate, a positive electrode plate, a separator, and an electrolyte.

Further, the electrochemical device may be a lithium-ion battery provided in the present application.

According to the electrochemical device provided in the present application, a negative electrode plate of the electrochemical device uses the negative electrode plate provided in the present application, and other components include the positive electrode plate, the separator, the electrolyte, and the like, which is not particularly limited in the present application. For example, a positive electrode material contained in the positive electrode plate may include, but is not limited to, lithium cobaltate, lithium manganate, lithium iron phosphate and the like. A material of the separator may include, but is not limited to, fiberglass, polyester, polyethylene, polypropylene, polytetrafluoroethylene or a combination thereof. The electrolyte generally includes an organic solvent, a lithium salt, and an additive. The organic solvent may include, but is not limited to, at least one of ethylene carbonate (EC), propylene carbonate (PC), diethyl carbonate (DEC), ethyl methyl carbonate (EMC), dimethyl carbonate (DMC), propylene carbonate, and ethyl propionate. The lithium salt may include at least one of an organic lithium salt or an inorganic lithium salt. For example, the lithium salt may include at least one of lithium hexafluorophosphate ($LiPF_6$), lithium tetrafluoroborate ($LiBF_4$), lithium difluorophosphate ($LiPO_2F_2$), lithium bistrifluoromethanesulfonimide LiN ($CF_3SO_2$)$_2$ (LiTFSI), lithium bis(fluorosulfonyl)imide $Li(N(SO_2F)_2)$ (LiFSI), lithium bisoxalateborate $LiB(C_2O_4)_2$ (LiBOB), or lithium difluorooxalateborate $LiBF_2(C_2O_4)$ (LiDFOB).

A preparation process of the electrochemical device is well known to a person skilled in the art, which is not particularly limited in the present application. For example, a secondary battery may be manufactured according to the following process: stacking the positive electrode and the negative electrode through a spacer, putting them into a battery container after operations such as winding and folding as required, and injecting an electrolyte into the battery container and sealing. The negative electrode used herein is the above negative electrode plate provided in the present application. In addition, an overcurrent preventing element, a guide plate, and the like may also be placed in the battery container as required, thereby preventing pressure rise, and overcharge and overdischarge inside the battery.

A fourth aspect of the present application provides an electronic device, which includes the above electrochemical device.

Testing Methods

Solid-State NMR:

$^{29}$Si solid-state NMR spectroscopy was performed on an instrument AVANCE III 400 WB wide-cavity solid-state NMR spectrometer with a rotation rate of 8 kHz corresponding to $^{29}$Si.

Particle Size Test:

About 0.02 g of each sample powder was added to a 50 ml clean beaker. About 20 ml of deionized water was added. A few drops of a 1% surfactant were then added dropwise to completely disperse the negative electrode material powder in water. The mixture was subject to ultrasonic for 5 minutes in a 120 W ultrasonic cleaning machine. The particle size distribution was tested by using MasterSizer 2000.

Test of a Specific Surface Area of a Negative Electrode Material:

At a constant temperature and a low temperature, after adsorption amounts of a gas on a solid surface at different relative pressures were measured, an adsorption amount of a sample monolayer was calculated based on Brownnauer-Ett-Taylor adsorption theory and a formula thereof (BET formula), thereby calculating a specific surface area of the solid.

Charge-and-Discharge Performance Test:

The negative electrode material, conductive carbon black, and a binder polyacrylic acid (PAA) were mixed with deionized water at a mass ratio of 80:10:10 to form a slurry by stirring. A coating having a thickness of 100 μm was applied with a scraper blade. After drying in a vacuum oven at a temperature of 85° C. for 12 hours, the coating was cut into discs having a diameter of 1 cm by using a punching machine in a dry environment. A metal lithium plate was used as a counter electrode in a glove box, and a ceglard composite membrane was selected as a separator. An electrolyte was added to assemble a button battery. A charge-and-discharge test was performed on the battery by using a LAND series battery test system, to test the charge-and-discharge performance of the battery.

Cycle Performance Test:

At a testing temperature of 25/45° C., a lithium-ion battery was charged to 4.4 V with a 0.7 C constant current, and was charged to 0.025 C with a constant voltage. The lithium-ion battery was discharged to 3.0 V with 0.5 C after standing for 5 minutes. A capacity obtained in this step was taken as the initial capacity. 0.7 C charge/0.5 C discharge were carried out for a cycle test. A capacity decay curve was obtained based on a ratio of the capacity in each step to the initial capacity. A number of cycles obtained when the cycle test was performed at 25° C. until a capacity retention rate reached 80% was recorded as room temperature cycle performance of the lithium-ion battery. A number of cycles obtained when the cycle test was performed at 45° C. until a capacity retention rate reached 80% was recorded as high temperature cycle performance of the lithium-ion battery. The cycle performance of the material was obtained by comparing the number of cycles in the above two cases.

K Value Test:

After testing the capacity of the lithium-ion battery, the lithium-ion battery was allowed to stand at room temperature for 48 hours, and the measured voltage thereof was V1. After the above lithium-ion battery was then allowed to stand for another 48 hours, the voltage V2 thereof was measured. The K value was then calculated according to the following formula: K=(V1−V2)/48; and the K value is in a unit of mV/h.

Test of a Compaction Density of a Negative Electrode Material:

According to GB/T 24533-2009 "Graphite Negative Electrode Materials for Lithium-ion Batteries", a specific amount of the negative electrode material powder was placed on a mold designated for compaction (with a known diameter of the mold). The mold was hollow in the middle, and contained a metal disc on each of upper and lower sides. The powder was placed between the metal discs, and a metal column was placed on the top. The mold was placed on a compaction density instrument. Different pressures were set. The thickness of the negative electrode material powder under different pressures can be read on the instrument. The compaction density of the negative electrode material was calculated according to ρ=m/v.

Carbon Content Test:

A sample was heated and burned at a high temperature in a high-frequency furnace under oxygen-rich conditions to oxidize carbon and sulfur into carbon dioxide and sulfur dioxide. The gases entered corresponding absorption pools after treatment. Corresponding infrared radiation was absorbed and then converted into corresponding signals via a detector. This signals were sampled by a computer and converted to numerical values proportional to concentrations of the carbon dioxide and the sulfur dioxide after linear correction. The values of the whole analysis process were then accumulated. After completion of analysis, the accumulated value was divided by a weight value in the computer, and then multiplied by a correction coefficient with a blank subtracted, to obtain percentage contents of carbon and sulfur in the sample. The sample test was performed by using a high-frequency infrared carbon-sulfur analyzer (Shanghai Dekai HCS-140).

Test of Electron Conductivity of Negative Electrode Material Powder:

According to the four-wire two-terminal method, a resistance of a constant body was determined by measuring voltages and currents flowing across two terminals of the resistance to be measured (namely, a sample tablet). A conductivity was calculated in combination with a height and bottom area of the resistance to be measured. A specific amount of negative electrode material powder was taken and added to a test mold. After the negative electrode material powder was gently shaken flat, a gasket on the mold was then placed on the sample. After completion of sample loading, the mold was placed on a working table of an electronic pressure testing machine. The pressure was raised to 500 kg (159 Mpa) at a rate of 5 mm/min. The pressure was held for 60 seconds, and then released to 0. When the constant pressure of the sample reached 5000±2 kg (about 15 to 25 seconds after the pressure was raised to 5000 kg), the pressure of the sample was recorded, and a deformation height of the sample was read. A numerical value displayed by a resistance tester (Suzhou Lattice Electronics ST-2255A) at this time was recorded. The conductivity can be calculated according to the following formula:

$$\Delta = h/(S*R)/1000$$

where δ is an electronic conductivity, h is a height of the sample tablet, S is a bottom area of the sample tablet, and R is a read resistance.

Hereinafter, the present application will be specifically described based on the embodiments, but the present application is not limited to these embodiments.

Preparation of a Full Battery

Preparation Example 1: Preparation of a Positive Electrode Plate

Dissolving an active substance $LiCoO_2$, conductive carbon black, and a binder polyvinylidene fluoride (PVDF) in an N-methylpyrrolidone solvent system at a weight ratio of 96.7:1.7:1.6 to form a slurry having solid content of 75 wt %, followed by evenly stirring. Coating the slurry uniformly on a surface of a positive electrode current collector aluminum foil having a thickness of 12 μm with a coating thickness of 115 μm, drying at 90° C. and cold pressing to obtain a positive electrode plate. Cutting the positive electrode plate into sheets having a size of 74 mm×867 mm for use.

Preparation Example 2: Preparation of a Negative Electrode Plate

Mixing the negative electrode materials prepared in each of embodiments and comparative embodiments with graphite at a specific ratio to obtain negative electrode active material powder having a designed mixed gram capacity of 500 mAh/g. Dissolving the negative electrode active material powder, a conductive agent acetylene black, and PAA in a deionized water solvent system at a weight ratio of 95:1.2:3.8, fully stirring and mixed to obtain a slurry having solid content of 45 wt %. Coating the slurry on two surfaces of a copper foil current collector having a thickness of 10 μm with a coating thickness of 100 μm. Drying an electrode plate and cold pressing with a double-sided compaction density of 1.8 g/cm³ to obtain a negative electrode plate. Cutting the negative electrode plate into sheets having a size of 74 mm×867 mm for use.

Preparation Example 3 Preparation of a Lithium-Ion Battery

Using a PE porous polymer membrane having a thickness of 15 μm as a separator, stacking the positive electrode plate, the separator, and the negative electrode plate in sequence to make the separator be in the middle of the positive and negative electrodes to play a role of separation, and performing winding to obtain an electrode assembly.

Placing the electrode assembly in an outer package, injecting a prepared electrolyte (EC:DMC:DEC=1:1:1 vol %, 10 wt % FEC, 1 mol/L $LiPF_6$) and packaging the electrode assembly. Performing technological processes such as forming, degassing, and trimming to obtain a lithium-ion battery.

Preparation of a Negative Electrode Material

Dissolving a carbon source (including at least one of glucose or sucrose) in a xylene solvent, after complete dissolution, adding organosilicon (including at least one of polysiloxane, polycarbosilane, polysilazane, polycarbborane methylsiloxane or polysilaborazane) at a specific ratio, stirring for 4 hours to completely immerse the carbon source solution and the organosilicon solution, then stirring and heating at 80° C. to remove the solvent, and putting the product into an 80° C. drying oven for 24 hours.

Putting the obtained product into a tube furnace for high temperature pyrolysis. Nitrogen or argon is used as a protective atmosphere, and a heating procedure is as follows:

heating to 500° C. at a rate of 1° C./min, holding for 30 min, further heating to a range from 900° C. to 1500° C. at a rate of 3° C./min for 3 hours, and performing high temperature pyrolysis to obtain the negative electrode material $SiM_xC_y$.

Embodiment 1

Dissolving 50 g of glucose in 100 mL of a xylene solvent, and then adding 50 g of polysiloxane into it. Stirring for 4 hours to completely immerse the glucose solution and the polysiloxane solution, stirring and heating subsequently at a temperature of 80° C. to remove the solvent, and then putting the product into an 80° C. drying oven for 24 hours. Putting the obtained product into a tube furnace for high temperature pyrolysis. Specifically, Ar is used as a protective atmosphere, heating the temperature to 500° C. at a rate of 1° C./min, holding for 30 min and further heating to 900° C. at a rate of 3° C./min for 3 hours. Performing high temperature pyrolysis to obtain the negative electrode material SiOC (silicon-carbon-oxygen ceramic material).

Placing the obtained negative electrode material SiOC in a ball-milling jar, performing ball-milling at a rotational speed of 50 Hz for 40 min, and then filtering with a 200-mesh filter sieve. Screening with a vibrating sieve to obtain a negative electrode material SiOC having particle size distribution of $D_V50=8$ μm, $D_N50=5$ μm, $D_N99=15$ μm, $D_N1=0.5$ μm, and $\Delta D_N=13$ μm, BET of 5 m²/g, and a conductivity of 15 S/cm.

Embodiment 2

Other processes are the same as those in Embodiment 1, except that $D_V50$ of the screened negative electrode material SiOC is changed to 10 μm.

Embodiments 3 to 4

Other processes are the same as those in Embodiment 1, except that $D_N50$ of the screened negative electrode material SiOC is changed to 3 μm and 6 μm, respectively.

Embodiments 5 to 6

Other processes are the same as those in Embodiment 1, except that $D_N99$ of the screened negative electrode material SiOC is changed to 14 μm and 17 μm, respectively.

Embodiments 7 to 8

Other processes are the same as those in Embodiment 1, except that $D_N1$ of the screened negative electrode material SiOC is changed to 0.1 μm and 1 μm, respectively.

Embodiment 9

Other processes are the same as those in Embodiment 1, except that $\Delta D_N$ of the screened negative electrode material SiOC is changed to 14 μm.

Embodiment 10

Other processes are the same as those in Embodiment 1, except that $D_V50$ of the screened negative electrode material SiOC is changed to 5 μm, the $D_N50$ to 3 μm, $D_N99$ to 13 μm, $D_N1$ to 0.4 μm, and $\Delta D_N$ to 10 μm.

Embodiment 11

Other processes are the same as those in Embodiment 1, except that $D_V50$ of the screened negative electrode material SiOC is changed to 10 $\mu$m, $D_N 50$ to 6 $\mu$m, $D_N 99$ to 18 $\mu$m, $D_N 1$ to 1 $\mu$m, and $\Delta D_N$ to 14 $\mu$m.

Embodiment 12

Other processes are the same as those in Embodiment 1, except that $D_V 50$ of the screened negative electrode material SiOC is changed to 7 $\mu$m, $D_N 50$ to 4 $\mu$m, $D_N 99$ to 14 $\mu$m, $D_N 1$ to 0.4 $\mu$m, and $\Delta D_N$ to 12 $\mu$m.

Embodiment 13

Other processes are the same as those in Embodiment 1, except that $D_V 50$ of the screened negative electrode material SiOC is changed to 4 $\mu$m, $D_N 50$ to 1.5 $\mu$m, $D_N 99$ to 11 $\mu$m, $D_N 1$ to 0.2 $\mu$m, and $\Delta D_N$ to 9 $\mu$m.

Embodiment 14

Other processes are the same as those in Embodiment 1, except that a conductivity of the screened negative electrode material SiOC is changed to 30 S/cm.

Comparative Embodiment 1

Other processes are the same as those in Embodiment 1, except that $D_V 50$ of the screened negative electrode material SiOC is changed to 6 $\mu$m.

Comparative Embodiment 2

Other processes are the same as those in Embodiment 1, except that $D_N 50$ of the screened negative electrode material SiOC is changed to 1 $\mu$m.

Comparative Embodiment 3

Other processes are the same as those in Embodiment 1, except that $D_N 99$ of the screened negative electrode material SiOC is changed to 22 $\mu$m.

Comparative Embodiment 4

Other processes are the same as those in Embodiment 1, except that $D_N 1$ of the screened negative electrode material SiOC is changed to 0.01 $\mu$m.

Comparative Embodiment 5

Other processes are the same as those in Embodiment 1, except that $\Delta D_N$ of the screened negative electrode material SiOC is changed to 3 $\mu$m.

Comparative Embodiment 6

Other processes are the same as those in Embodiment 1, except that $D_V 50$ of the screened negative electrode material SiOC is changed to 14 $\mu$m, $D_N 50$ to 7 $\mu$m, $D_N 99$ to 15 $\mu$m, $D_N 1$ to 0.5 $\mu$m, and $\Delta D_N$ to 13 $\mu$m.

Comparative Embodiment 7

Other processes are the same as those in Embodiment 1, except that $D_V 50$ of the screened negative electrode material SiOC is changed to 3 $\mu$m and $D_N 50$ to 2 $\mu$m.

The parameters and test results of each of the embodiments and comparative embodiments are shown in Table 1 and Table 2.

TABLE 1

Parameters and test results of each of the embodiments and comparative embodiments

| | Dv50 ($\mu$m) | $D_N 50$ ($\mu$m) | $D_N 99$ ($\mu$m) | $D_N 1$ ($\mu$m) | $\Delta D_N$ ($\mu$m) | Dv50-$D_N 50$ | $(D_N 99$-$D_N 1)\Delta D_N$ | BET ($m^2$/g) | Conductivity (S/cm) |
|---|---|---|---|---|---|---|---|---|---|
| Embodiment 1 | 8 | 5 | 15 | 0.5 | 13 | 3 | 1.12 | 5 | 15 |
| Embodiment 2 | 10 | 5 | 15 | 0.5 | 13 | 5 | 1.12 | 5 | 15 |
| Embodiment 3 | 8 | 3 | 15 | 0.5 | 13 | 5 | 1.12 | 5 | 15 |
| Embodiment 4 | 8 | 6 | 15 | 0.5 | 13 | 2 | 1.12 | 5 | 15 |
| Embodiment 5 | 8 | 5 | 14 | 0.5 | 13 | 3 | 1.04 | 5 | 15 |
| Embodiment 6 | 8 | 5 | 17 | 0.5 | 13 | 3 | 1.27 | 5 | 15 |
| Embodiment 7 | 8 | 5 | 15 | 0.1 | 13 | 3 | 1.15 | 5 | 15 |
| Embodiment 8 | 8 | 5 | 15 | 1 | 13 | 3 | 1.08 | 5 | 15 |
| Embodiment 9 | 8 | 5 | 15 | 0.5 | 14 | 3 | 1.04 | 5 | 15 |
| Embodiment 10 | 5 | 3 | 13 | 0.4 | 10 | 7 | 1.20 | 6 | 15 |
| Embodiment 11 | 10 | 6 | 18 | 1 | 14 | 4 | 1.21 | 1 | 15 |
| Embodiment 12 | 7 | 4 | 14 | 0.4 | 12 | 3 | 1.13 | 5.5 | 15 |
| Embodiment 13 | 4 | 1.5 | 11 | 0.2 | 9 | 2.5 | 1.2 | 8 | 15 |
| Embodiment 14 | 8 | 5 | 15 | 0.5 | 13 | 3 | 1.12 | 5 | 30 |
| Comparative Embodiment 1 | 6 | 5 | 15 | 0.5 | 13 | 1 | 1.12 | 5 | 15 |
| Comparative Embodiment 2 | 8 | 1 | 15 | 0.5 | 13 | 7 | 1.12 | 5 | 15 |
| Comparative Embodiment 3 | 8 | 5 | 22 | 0.5 | 13 | 3 | 1.65 | 5 | 15 |
| Comparative Embodiment 4 | 8 | 5 | 15 | 0.01 | 13 | 3 | 1.15 | 5 | 15 |
| Comparative Embodiment 5 | 8 | 5 | 15 | 0.5 | 3 | 3 | 4.83 | 5 | 15 |
| Comparative Embodiment 6 | 14 | 7 | 15 | 0.5 | 13 | 7 | 1.12 | 0.5 | 50 |
| Comparative Embodiment 7 | 3 | 2 | 15 | 0.5 | 13 | 1 | 1.12 | 15 | 15 |

TABLE 2

Test results of each of the embodiments
and comparative embodiments

| | Powder compaction density (g/cc, 5 t) | Number of cycles (capacity 80%, 25° C.) | Number of cycles (capacity 80%, 45° C.) | K value (mV/h) |
|---|---|---|---|---|
| Embodiment 1 | 1.55 | 850 | 523 | 0.065 |
| Embodiment 2 | 1.47 | 842 | 519 | 0.064 |
| Embodiment 3 | 1.48 | 821 | 489 | 0.064 |
| Embodiment 4 | 1.33 | 845 | 525 | 0.066 |
| Embodiment 5 | 1.60 | 876 | 542 | 0.058 |
| Embodiment 6 | 1.51 | 845 | 519 | 0.067 |
| Embodiment 7 | 1.54 | 843 | 492 | 0.064 |
| Embodiment 8 | 1.57 | 855 | 534 | 0.065 |
| Embodiment 9 | 1.62 | 854 | 527 | 0.063 |
| Embodiment 10 | 1.58 | 847 | 518 | 0.064 |
| Embodiment 11 | 1.47 | 841 | 515 | 0.067 |
| Embodiment 12 | 1.56 | 832 | 514 | 0.066 |
| Embodiment 13 | 1.59 | 843 | 511 | 0.062 |
| Embodiment 14 | 1.44 | 874 | 535 | 0.064 |
| Comparative Embodiment 1 | 1.36 | 835 | 514 | 0.066 |
| Comparative Embodiment 2 | 1.46 | 810 | 472 | 0.062 |
| Comparative Embodiment 3 | 1.46 | 831 | 503 | 0.074 |
| Comparative Embodiment 4 | 1.52 | 834 | 487 | 0.065 |
| Comparative Embodiment 5 | 1.31 | 844 | 515 | 0.067 |
| Comparative Embodiment 6 | 1.32 | 836 | 504 | 0.069 |
| Comparative Embodiment 7 | 1.64 | 828 | 495 | 0.06 |

As can be seen from Embodiments 1 to 4 and Comparative Embodiments 1 and 2, when a value of $(D_V50-D_N50)$ is excessively small (such as Comparative Embodiment 1), due to concentrated particle size distribution, the compaction density is relatively low. When a value of $(D_V50-D_N50)$ is excessively large (such as Comparative Embodiment 2), there is more fine powder in the particle distribution so that the high temperature cycle performance is also relatively poor while the compaction density is relatively low.

As can be seen from Embodiments 1 and 5 to 6 and Comparative Embodiment 3, when $D_N1$ and $\Delta D_N$ are unchanged but $D_N99$ is excessively large (such as Comparative Embodiment 3), on the one hand, the particle distribution is caused to be uneven, thereby resulting in a relatively low compaction density. On the other hand, the larger particles are made to be more, thereby deteriorating the cycle performance and the K value.

As can be seen from Embodiments 7 and 8 and Comparative Embodiment 4, when $D_N99$ and $\Delta D_N$ are unchanged, and as $D_N1$ becomes larger, on the one hand, the particle distribution is more uniform so that the compaction density is increased. On the other hand, the smaller particles are made to be fewer, thereby improving the high temperature cycle performance. When $D_N1$ is excessively small (such as Comparative Embodiment 4), the compaction density is made to be low, resulting in deteriorating the high temperature cycle performance.

As can be seen from Embodiments 1 and 9 and Comparative Embodiment 5, when $D_N99$ and $D_N1$ are unchanged but $\Delta D_N$ is larger, the particle distribution is made to be more uniform, thereby effectively increasing the compaction density with a relatively small impact on the cycle performance.

As can be seen from Embodiments 10 to 13, as the average particle size $(D_V50)$ of the negative electrode material powder becomes small, the BET of the powder becomes large, so that the larger the compaction density of the powder, the smaller the K value.

As can be seen from Comparative Embodiments 6 and 7, when the BET is excessively small (such as Comparative Embodiment 6), due to the relatively large average particle size and the relatively large particle stress, the negative electrode material is easily broken, and thus the cycle performance is relatively poor. The excessively large BET (such as Comparative Embodiment 7) increases the side reactions, thereby deteriorating the cycle performance.

As can be seen from Embodiments 1 to 14 and Comparative Embodiment 6, the negative electrode material powder having a conductivity within a range from 2 to 30 S/cm has a higher compaction density.

The above descriptions are merely preferable embodiments of the present application, but are not intended to limit the present application. Any modification, equivalent replacement, improvement or the like made without departing from the spirit and principle of the present application shall fall within the protection scope of the present s application.

What is claimed is:

1. A negative electrode material, wherein the negative electrode material comprises $SiM_xC_y$, wherein $0.5{\le}x{\le}2$, $0.5{\le}y{\le}4$, and M comprises at least one of boron, nitrogen, oxygen, or aluminum; and 2 $\mu m{\le}(D_V50-D_N50){\le}6$ $\mu m$, and $1{\le}(D_N99-D_N1)/\Delta D_N{\le}1.3$, where $D_V50$ is a particle size of the $SiM_xC_y$ at a volume accumulation degree of 50%, $D_N50$ is a particle size of the $SiM_xC_y$ at a quantity accumulation degree of 50%, $D_N99$ is a particle size of the $SiM_xC_y$ at a quantity accumulation degree of 99%, $D_N1$ is a particle size of the $SiM_xC_y$ at a quantity accumulation degree of 1%, and $\Delta D_N$ is a half-peak width of a quantity distribution curve of the $SiM_xC_y$.

2. The negative electrode material according to claim 1, wherein, 12.0 $\mu m{<}D_N99{<}20.0$ $\mu m$; 0.1 $\mu m{<}D_N1{<}1.0$ $\mu m$; 4.0 $\mu m{<}D_V50{<}10.0$ $\mu m$.

3. The negative electrode material according to claim 1, wherein in solid-state nuclear magnetic resonance tests of the negative electrode material, a shift of an element silicon comprises −5 ppm, −35 ppm, −75 ppm, and −110 ppm.

4. The negative electrode material according to claim 1, wherein a specific surface area of the negative electrode material is 1.0 m²/g to 8.0 m²/g.

5. The negative electrode material according to claim 1, wherein the negative electrode material has a powder conductivity of 2.0 S/cm to 30 S/cm.

6. The negative electrode material according to claim 1, wherein a nitrogen adsorption isotherm specified in IUPAC is type III.

7. The negative electrode material according to claim 1, wherein at least one of carbon, a high molecular weight polymer, or a composite of the above substances exists on a surface of the negative electrode material;

the carbon comprises at least one of amorphous carbon, a carbon nanotube, a carbon nanoparticle, a vapor-deposited carbon fiber, or graphene; and the high molecular weight polymer comprises at least one of polyvinylidene fluoride, carboxymethyl cellulose, sodium carboxymethylcellulose, polyvinylpyrrolidone, polyacrylic acid, polystyrene-butadiene rubber, or a derivative thereof.

8. An electronic device, comprising an electrochemical device, the electrochemical device comprises a negative electrode material, wherein the negative electrode material comprises $SiM_xC_y$, wherein $0.5 \leq x \leq 2$, $0.5 \leq y \leq 4$, and M comprises at least one of boron, nitrogen, oxygen, or aluminum; and 2 $\mu m \leq (D_V50 - D_N50) \leq 6$ $\mu m$, and $1 \leq (D_N99 - D_N1)/\Delta D_N \leq 1.3$, where $D_V50$ is a particle size of the SiMxCy at a volume accumulation degree of 50%, $D_N50$ is a particle size of the SiMxCy at a quantity accumulation degree of 50%, $D_N99$ is a particle size of the SiMxCy at a quantity accumulation degree of 99%, $D_N1$ is a particle size of the SiMxCy at a quantity accumulation degree of 1%, and $\Delta D_N$ is a half-peak width of a quantity distribution curve are particle size parameters of the SiMxCy.

9. The electronic device according to claim 8, wherein, 12.0 $\mu m < D_N99 < 20.0$ $\mu m$; 0.1 $\mu m < D_N1 < 1.0$ $\mu m$; 4.0 $\mu m < D_V50 < 10.0$ $\mu m$.

10. The electronic device according to claim 8, wherein in solid-state nuclear magnetic resonance tests of the negative electrode material, a shift of an element silicon comprises −5 ppm, −35 ppm, −75 ppm, and −110 ppm.

11. The electronic device according to claim 8, wherein a specific surface area of the negative electrode material is 1.0 $m^2/g$ to 8.0 $m^2/g$.

12. The electronic device according to claim 8, wherein the negative electrode material has a powder conductivity of 2.0 S/cm to 30 S/cm.

13. The electronic device according to claim 8, wherein a nitrogen adsorption isotherm specified in IUPAC is type III.

14. The electronic device according to claim 8, wherein at least one of carbon, a high molecular weight polymer, or a composite of the above substances exists on a surface of the negative electrode material;

the carbon comprises at least one of amorphous carbon, a carbon nanotube, a carbon nanoparticle, a vapor-deposited carbon fiber, or graphene; and the high molecular weight polymer comprises at least one of polyvinylidene fluoride, carboxymethyl cellulose, sodium carboxymethylcellulose, polyvinylpyrrolidone, polyacrylic acid, polystyrene-butadiene rubber, or a derivative thereof.

\* \* \* \* \*